United States Patent
Ramirez

(10) Patent No.: US 12,222,134 B2
(45) Date of Patent: Feb. 11, 2025

(54) AIR FILTRATION APPARATUS

(71) Applicant: Pablo Ramirez, Bakersfield, CA (US)

(72) Inventor: Pablo Ramirez, Bakersfield, CA (US)

( * ) Notice: Subject to any disclaimer, the term of this patent is extended or adjusted under 35 U.S.C. 154(b) by 427 days.

(21) Appl. No.: 17/859,762

(22) Filed: Jul. 7, 2022

(65) Prior Publication Data
US 2024/0011653 A1    Jan. 11, 2024

(51) Int. Cl.
| | |
|---|---|
| *F24F 8/125* | (2021.01) |
| *B01D 46/79* | (2022.01) |
| *F24F 8/142* | (2021.01) |
| *F24F 11/89* | (2018.01) |
| *F24F 13/20* | (2006.01) |
| *F24F 13/28* | (2006.01) |

(52) U.S. Cl.
CPC ............. *F24F 8/125* (2021.01); *B01D 46/79* (2022.01); *F24F 8/142* (2021.01); *F24F 11/89* (2018.01); *F24F 13/20* (2013.01); *F24F 13/28* (2013.01); *B01D 2273/30* (2013.01); *F24F 2013/205* (2013.01); *F24F 2221/225* (2013.01)

(58) Field of Classification Search
CPC .. F24F 8/125; F24F 8/142; F24F 11/89; F24F 13/20; F24F 13/28; F24F 2013/205; F24F 2221/225; B01D 46/79; B01D 2273/30
See application file for complete search history.

(56) References Cited

U.S. PATENT DOCUMENTS

| | | | |
|---|---|---|---|
| 6,440,190 B1 * | 8/2002 | Goyetche | B01D 46/10 55/438 |
| 11,185,807 B1 * | 11/2021 | Mazzella | F04D 29/522 |
| 2005/0166758 A1 * | 8/2005 | Volo | B01D 46/0005 96/108 |
| 2006/0168925 A1 * | 8/2006 | Whittemore | F04D 29/646 55/490 |
| 2016/0025110 A1 * | 1/2016 | Whittemore | F04D 29/522 55/501 |
| 2019/0282943 A1 * | 9/2019 | Duncan | B01D 46/0005 |

FOREIGN PATENT DOCUMENTS

KR    20100043154 A  *  4/2010

\* cited by examiner

*Primary Examiner* — Robert Clemente

(57) ABSTRACT

An air filtration apparatus includes a motor, a fan blade, an air filter, a housing, a filter cleaning assembly, and a control panel. A stator of the motor is concentrically mounted within the housing, and the fan blade is concentrically mounted to a rotor of the motor so that the air can be moved via the fan blade. The air filter is externally mounted to a rear panel of the housing to purify incoming air. The filter cleaning assembly is integrated to the air filter and is in fluid communication with the air filter so that the air filter can be cleaned when necessary. The control panel being electrically connected to the motor and the filter cleaning assembly to continuously operates the air filtration apparatus.

19 Claims, 9 Drawing Sheets

AIR FILTRATION APPARATUS

FIELD OF THE INVENTION

The present invention generally relates to an air filtration system for air purification. More specifically, the present invention cleans polluted air through an air filter, and then is also able to clean the air filter once the air filter gets dirty.

BACKGROUND OF THE INVENTION

An air purifier or air cleaner is a device which removes contaminants from the air in a room or an outdoor setting to improve air quality. These devices are commonly marketed as being beneficial to allergy sufferers and asthmatics, and at reducing or eliminating second-hand tobacco smoke. The commercially graded air purifiers are manufactured as either small stand-alone units or larger units that can be affixed to an air handler unit (AHU) or to an HVAC unit found in the medical, industrial, and commercial industries. Air purifiers may also be used in industry to remove impurities from air before processing. However, the existing air purifiers needs regular maintenance when it comes to changing or cleaning of the air filter. Failure to continue regular maintenance can result in underperforming or non-operational air purifiers.

It is an objective of the present invention to provide an air filtration apparatus that eliminates the aforementioned problem. The present invention utilizes an integrated filter cleaning assembly and dirt detecting sensors to automatically clean out an integrated air filter when necessary. More specifically, when operational, the present invention continuously purifies surrounding air. When the integrated air filter has to be cleaned, the present invention is able to automatically detect that via dirt detecting sensors and then activate the integrated filter cleaning assembly. Once the integrated air filter is cleaned, the present invention restarts the air purification process. As a result, the present invention is able to provide an improved air filtration apparatus that can be used within an indoor setting or an outdoor setting.

DETAIL DESCRIPTIONS OF THE INVENTION

Figure 1:
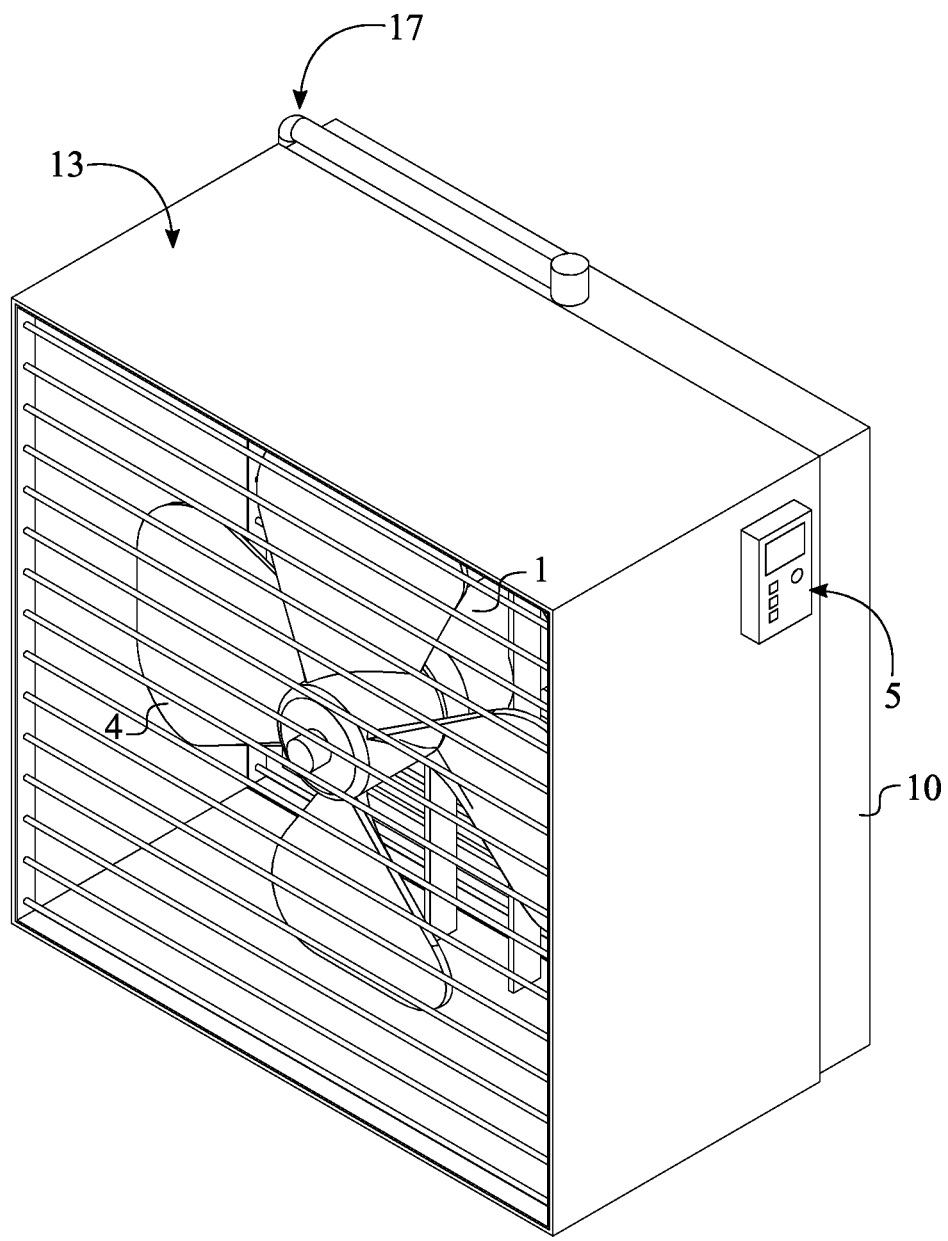
FIG. 1 is a front perspective view of the present invention.

All illustrations of the drawings are for the purpose of describing selected versions of the present invention and are not intended to limit the scope of the present invention.

The present invention is an air filtration apparatus that continuously purifies surrounding air in an outdoor setting or an indoor setting. More specifically, the present invention is able to automatically detect a dirty air filter via dirt detecting sensors to activate an integrated filter cleaning unit that can clean the dirty air filter. Once the air filter is cleaned, the present invention is able to restarts the air purification process. In reference to FIG. 1-2, the present invention comprises a motor 1, a fan blade 4, an air filter 10, a housing 13, a filter cleaning system 17, and a control box 5.

As shown in FIG. 1-6, in reference to the general configuration, the housing 13 that functions as the structural body of the present invention encloses the fan blade 4 and the motor 1. More specifically, a stator 2 of the motor 1 is concentrically mounted within the housing 13 so that the fan blade 4 can be concentrically mounted to a rotor 3 of the motor 1. As a result, when the motor 1 is powered, the fan blade 4 is able to move a flow of air through the housing 13. The air filter 10 is externally mounted to the rear panel 15 thus allowing a flow of contaminated air that enters from the rear side of the housing 13 to be purified. Once the flow of contaminated air is purified via the air filter 10, a flow of purified air can be discharged through the front side of the housing 13. The filter cleaning system 17 is integrated to the air filter 10 and is in fluid communication with the air filter 10. The filter cleaning system 17 is only activated when the air filter 10 is dirty so that the air filter 10 can be cleaned. The control box 5 is electrically connected to the motor 1 and the filter cleaning system 17 in order to activate the motor 1 and the filter cleaning system 17 based on the condition of the air filter 10 as shown in FIG. 9.

Figure 2:
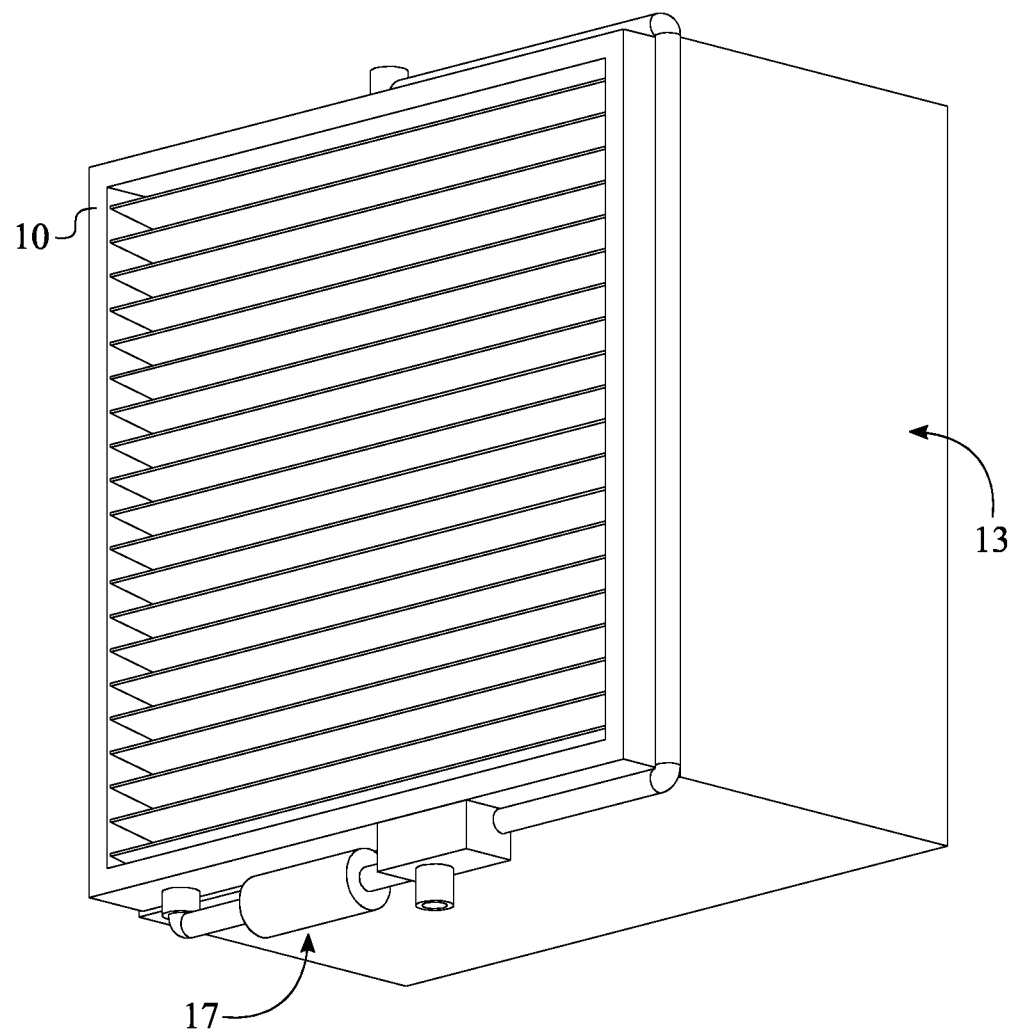
FIG. 2 is a rear perspective view of the present invention.
Figure 6:
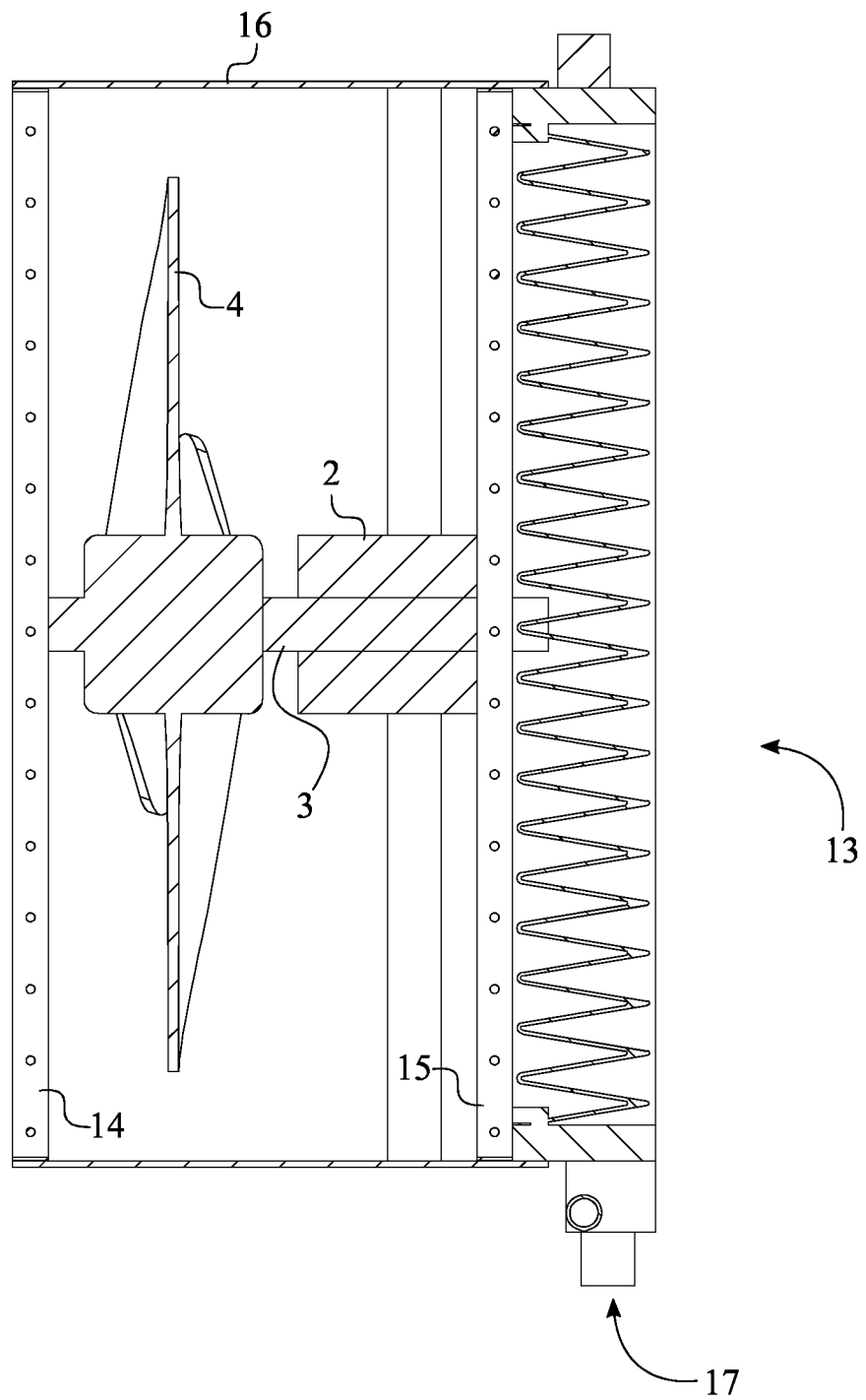
FIG. 6 is a cross section view of the present invention taken along line A-A of FIG. 5.

In reference to FIGS. 1-2 and FIG. 6, the housing 13 comprises a front panel 14, a rear panel 15, and a lateral panel 16. The housing 13 can be formed into any geometric shape without deviating from the scope of the present invention. More specifically, the front panel 14 and the rear panel 15 are oppositely positioned of each other about the lateral panel 16 as the lateral panel 16 provides the depth of the housing 13. The front panel 14 is perimetrically mounted to the lateral panel 16 so that the front side of the housing 13 can be enclosed. The rear panel 15 is perimetrically mounted to the lateral panel 16 so that the rear side of the housing 13 can be enclosed. Due to the configuration of the housing 13, the motor 1 and the fan blade 4 are able to rotate within the housing 13 freely and safely. The lateral panel 16 is preferably made from rigid material to maximize the strength of the housing. The front panel 14 and the rear panel 15 are preferably made from rigid and mesh material to maximize the air flow and efficiency of the present invention.

In reference to FIG. 6, the stator 2 is preferably mounted to the lateral panel 16 and concentrically positioned within the housing 13. However, the stator 2 can also be mounted to the rear panel 15 or front panel 14 depending upon different configurations. The concentric positioning of the stator 2 is essential to the present invention to eliminate any type of vibration of the rotor 3. When the motor 1 is powered through the control box 5, the rotor 3 is able to rotate the fan blade 4 that is internally positioned within the housing 13. The fan blade 4 is adjacently positioned to the front panel 14 so that the flow of contaminated air that purified via the air filter 10 can be discharged through the front panel 14.

Figure 8:
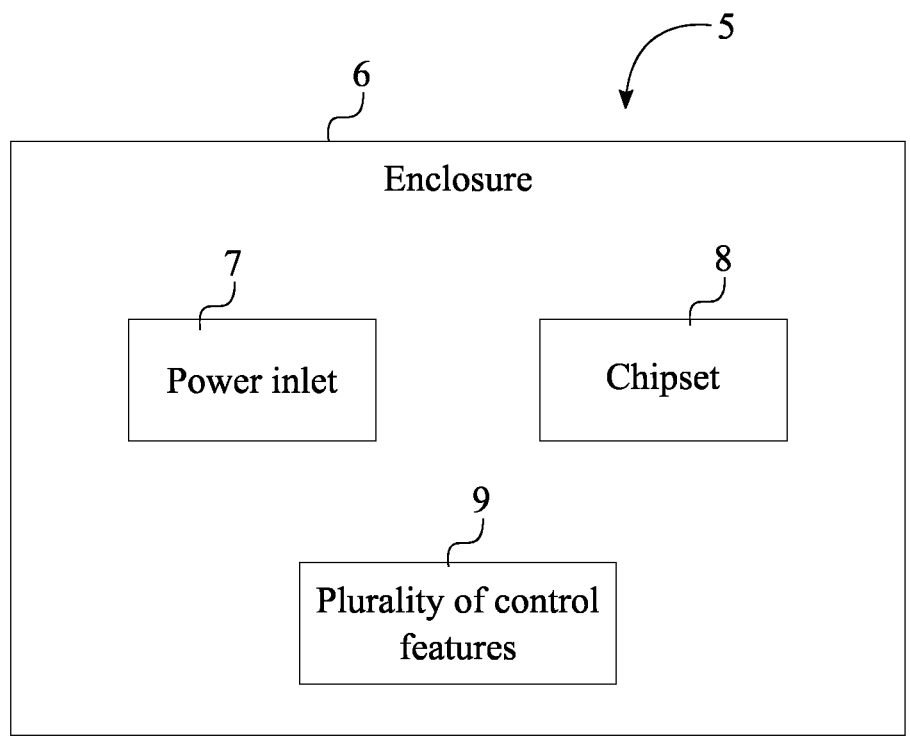
FIG. 8 is a schematic diagram showing the components for the control box of the present invention.
Figure 9:
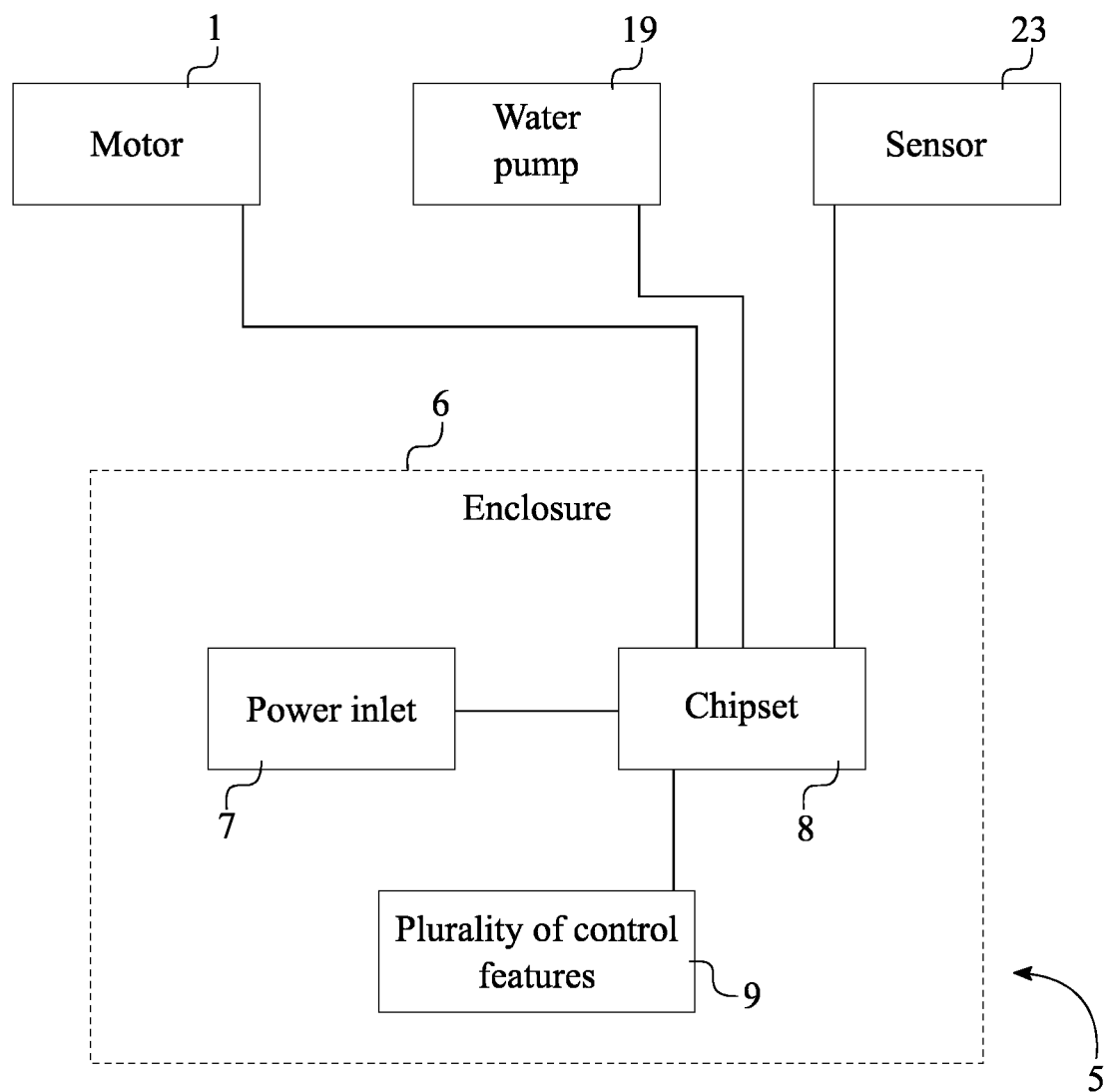
FIG. 9 is a schematic diagram showing the electrical connections of the present invention.

In reference to FIG. 1 and FIG. 8-9, the control box 5 comprises an enclosure 6, a power inlet 7, a chipset 8, and a plurality of control features 9. More specifically, the enclosure 6 is externally mounted to the housing 13 and functions as the platform to mount the rest of the components of the control box 5. The power inlet 7 is mounted onto the enclosure 6 so that a power cord can be electrically attached to the power inlet 7. As a result, the present invention is able to electrically power the motor 1 and the filter cleaning system 17 via the control box 5. The plurality of control features 9 are mounted onto the enclosure 6 thus allowing the user to control and operate the present invention. For example, the plurality of control features 9 can include, but is not limited to, a power button, a fan speed control button, a timer button, and a display screen. The chipset 8 is internally mounted to the enclosure 6 and executes all the input and output command according to the programmed features of the present invention. The power inlet 7 is electrically connected to the chipset 8 so that the chipset 8 is able to electrically connect with the plurality of control features 9 and the motor 1.

Figure 7:
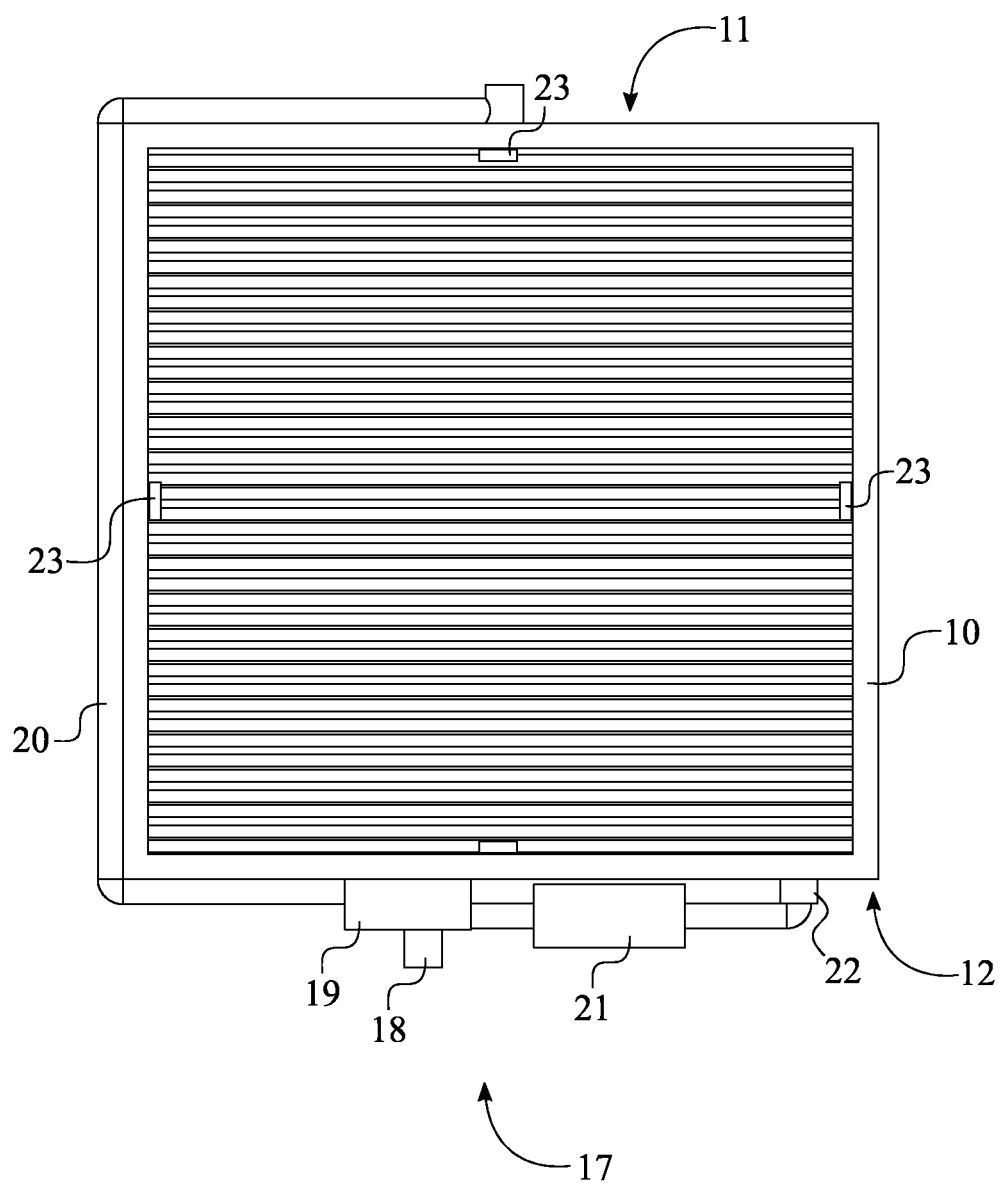
FIG. 7 is a front view of the air filter of the present invention.

In reference to FIG. 7 and FIG. 9, the filter cleaning system 17 that cleans the air filter 10 comprises a water inlet 18, a water pump 19, a water line 20, and a water outlet 22. More specifically, the water inlet 18 is in fluid communication with the water line 20 through the water pump 19. The water pump 19 is electrically connected to the chipset 8 of the control box 5 so that the filter cleaning system 17 can be activated when the air filter 10 is dirty. As a result, a flow of water can be pumped into the water line 20 via the water pump 19. The water line 20 is in fluid communication with the water outlet 22 through the air filter 10 so that the flow of water can clean and exit the air filter 10 via the water outlet 22. More specifically, the water line 20 is in fluid communication with a top end 11 of the air filter 10 thus discharging the flow of water into the top end 11 of the air filter 10. The discharged water then flows through the air filter 10 and removes any dirt and debris. A bottom end 12 of the air filter 10 is in fluid communication with the water outlet 22 so that the flow of dirty water can be discharged from the air filter 10. The discharged dirty water is then able to exit through the water outlet 22.

In some configuration of the present invention, the discharged dirty water from the water outlet 22 is completely drained into an existing water drain. As a result, a continuous flow of water is inputted into the water inlet 18 to complete the cleaning process of the air filter 10. Once the cleaning process is completed for the air filter 10, the chipset 8 is able to restart the air purification process.

In some configuration of the present invention, the discharged dirty water from the water outlet 22 is recycled back into the water pump 19 through a water filter 21 of the present invention as shown in FIG. 7. More specifically, the water outlet 22 is in fluid communication with the water pump 19 through the water filter 21 so that the discharged dirty water can be cleaned and recycled back into the filter cleaning system 17. As a result, a continuous flow of water may not be supplied into the water inlet 18 to complete the cleaning process of the air filter 10. Once the cleaning process is completed for the air filter 10, the chipset 8 is able to restart the air purification process.

Figure 3:
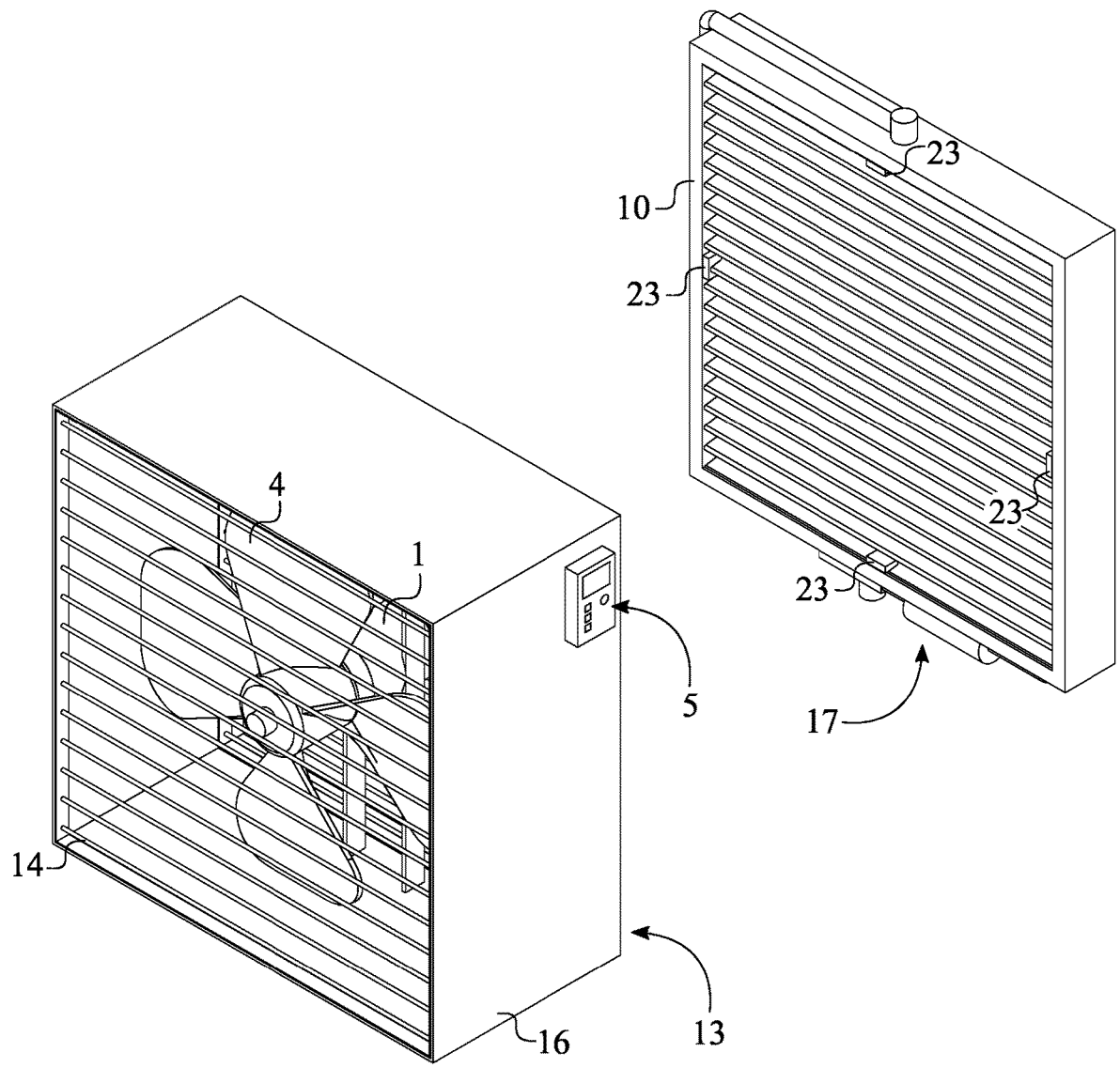
FIG. 3 is a front exploded view of the present invention between the housing and the air filter.
Figure 4:
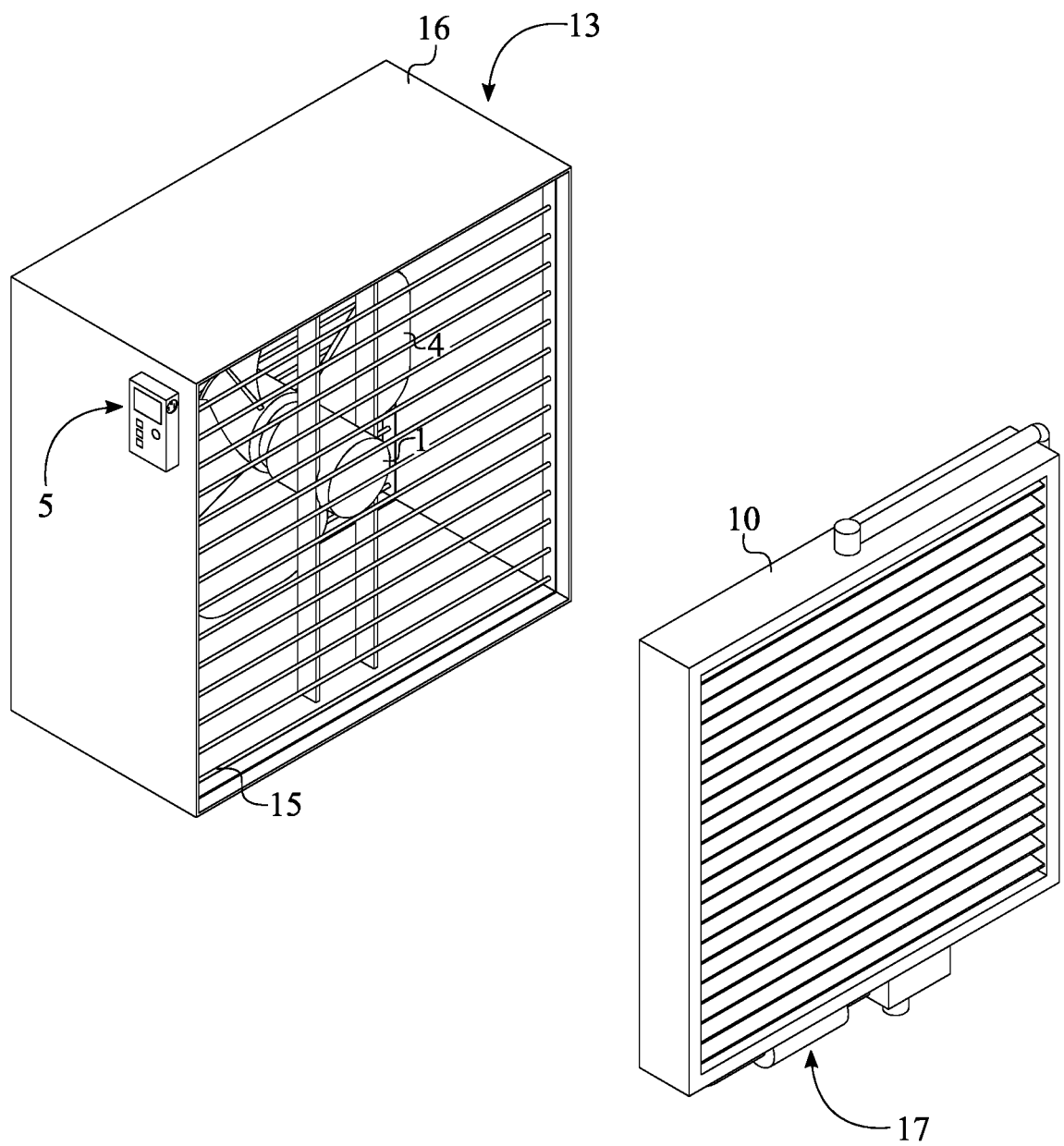
FIG. 4 is a rear exploded view of the present invention between the housing and the air filter.
Figure 5:
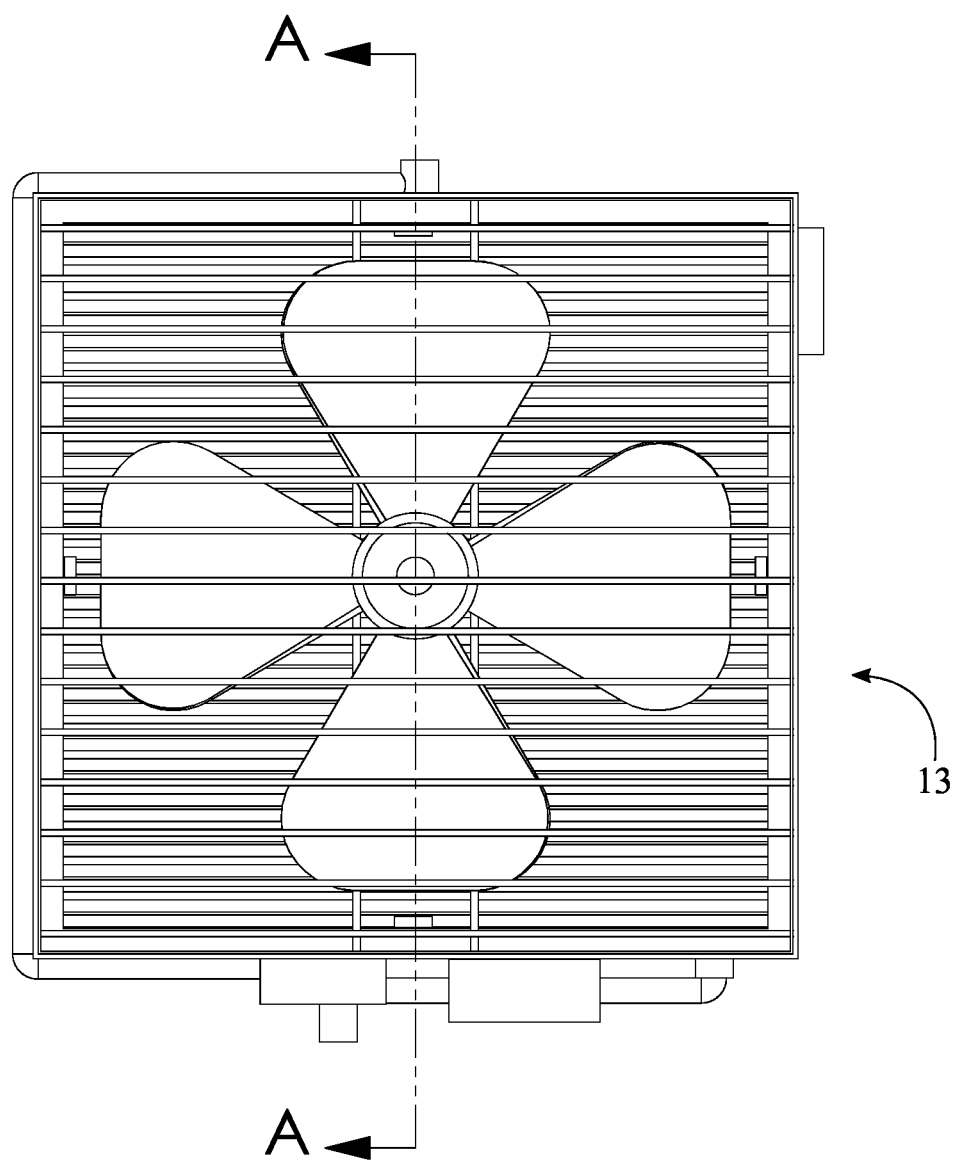
FIG. 5 is a front view of the present invention taken along line A-A of FIG. 6.

In reference to FIG. 3, FIG. 7, and FIG. 9, the present invention further comprises at least one sensor 23 so that dirt and debris of the air filter 10 can be detected. More specifically, the sensor 23 is integrated into the air filter 10 and electrically connected to the chipset 8. Preferably, three or more sensors 23 are utilized within the present invention to accurately determine condition of the air filter 10. For example, multiple sensors 23 can be perimetrically positioned within the air filter 10 and multiple sensors 23 can be centrally positioned within the air filter 10. Once the sensor 23 indicates that the air filter 10 needs to be cleaned, the chipset 8 activates the filter cleaning system 17 and temporarily stops the air purification process. Furthermore, the rotor 3 rotates in the opposite direction so that a flow of air cab be pulled through the front panel 14 and discharged through the rear panel 15 to blow away any dirt or debris to assist with the filter cleaning process. In other words, the rotational direction of the rotor 3 is determined by the chipset 8 with relative to the air purification process and the filter cleaning process. For example, when the air purification is in progress, the fan blade 4 rotates in clockwise direction and pulls the flow of contaminated air through the air filter 10 and the rear panel 15 to be discharged through the front panel 14 as the flow of purified air. When the filter cleaning process is in progress, the fan blade 4 rotates in counterclockwise direction and pulls a flow of air through the front panel 14 to be discharged through the rear panel 15 and the air filter 10.

The air filter 10 utilized within the present invention is a washable air filter 10 as the filter cleaning system 17 use a flow of water to clean the air filter 10. A high efficiency particulate air, also known as HEPA, filter 10 is utilized within the present invention to remove at least 99.97% of dust, pollen, mold, bacteria, and any airborne particles with a size of 0.3 microns ($\mu$m).

Although the invention has been explained in relation to its preferred embodiment, it is to be understood that many other possible modifications and variations can be made without departing from the spirit and scope of the invention as hereinafter claimed.

What is claimed is:

1. An air filtration apparatus comprising:
   a motor;
   a fan blade;
   an air filter;
   a housing;
   a filter cleaning system;
   a control box;
   the housing comprising a front panel, a rear panel, and a lateral panel;
   the front panel and the rear panel being oppositely positioned of each other about the lateral panel;
   the front panel being perimetrically mounted to the lateral panel;
   the rear panel being perimetrically mounted to the lateral panel;
   a stator of the motor being concentrically mounted within the housing;
   the fan blade being concentrically mounted to a rotor of the motor;
   the air filter being externally mounted to the rear panel;
   the filter cleaning system being integrated to the air filter;
   the filter cleaning system being in fluid communication with the air filter;
   the control box being electrically connected to the motor; and
   the control box being electrically connected to the filter cleaning system.

2. The air filtration apparatus as claimed in claim 1 comprising:
   the fan blade being internally positioned within the housing; and
   the fan blade being adjacently positioned to the front panel.

3. The air filtration apparatus as claimed in claim 1 comprising:
   the control box comprising an enclosure, a power inlet, a chipset, and a plurality of control features;
   the enclosure being externally mounted to the housing;
   the power inlet being mounted onto the enclosure;

the plurality of control features being mounted onto the enclosure;
the chipset being internally mounted to the enclosure;
the power inlet being electrically connected to the chipset; and
the plurality of control features being electrically connected to the chipset.

4. The air filtration apparatus as claimed in claim 1 comprising:
the filter cleaning system comprising a water inlet, a water pump, a water line, and a water outlet;
the water inlet being in fluid communication with the water line through the water pump;
the water pump being electrically connected to a chipset of the control box; and
the water line being in fluid communication with the water outlet through the air filter.

5. The air filtration apparatus as claimed in claim 4 comprising:
the water line being in fluid communication with a top end of the air filter; and
a bottom end of the air filter being in fluid communication with the water outlet.

6. The air filtration apparatus as claimed in claim 4 comprising:
a water filter; and
the water outlet being in fluid communication with the water pump through the water filter.

7. The air filtration apparatus as claimed in claim 1, wherein the motor is electrically connected to a chipset of the control box.

8. The air filtration apparatus as claimed in claim 1 comprising:
at least one sensor;
the sensor being integrated into the air filter; and
the sensor being electrically connected to a chipset of the control box.

9. The air filtration apparatus as claimed in claim 1, wherein the air filter is a washable air filter.

10. The air filtration apparatus as claimed in claim 1, wherein the air filter is a high efficiency particulate air filter.

11. An air filtration apparatus comprising:
a motor;
a fan blade;
an air filter;
a housing;
a filter cleaning system;
a control box;
at least one sensor;
the housing comprising a front panel, a rear panel, and a lateral panel;
the front panel and the rear panel being oppositely positioned of each other about the lateral panel;
the front panel being perimetrically mounted to the lateral panel;
the rear panel being perimetrically mounted to the lateral panel;
a stator of the motor being concentrically mounted within the housing;
the fan blade being concentrically mounted to a rotor of the motor;
the air filter being externally mounted to the rear panel;
the sensor being integrated into the air filter;
the filter cleaning system being integrated to the air filter;
the filter cleaning system being in fluid communication with the air filter;
the control box being electrically connected to the sensor;
the control box being electrically connected to the motor; and
the control box being electrically connected to the filter cleaning system.

12. The air filtration apparatus as claimed in claim 11 comprising:
the fan blade being internally positioned within the housing; and
the fan blade being adjacently positioned to the front panel.

13. The air filtration apparatus as claimed in claim 11 comprising:
the control box comprising an enclosure, a power inlet, a chipset, and a plurality of control features;
the enclosure being externally mounted to the housing;
the power inlet being mounted onto the enclosure;
the plurality of control features being mounted onto the enclosure;
the chipset being internally mounted to the enclosure;
the power inlet being electrically connected to the chipset; and
the plurality of control features being electrically connected to the chipset.

14. The air filtration apparatus as claimed in claim 11 comprising:
the filter cleaning system comprising a water inlet, a water pump, a water line, and a water outlet;
the water inlet being in fluid communication with the water line through the water pump;
the water pump being electrically connected to a chipset of the control box; and
the water line being in fluid communication with the water outlet through the air filter.

15. The air filtration apparatus as claimed in claim 14 comprising:
the water line being in fluid communication with a top end of the air filter; and
a bottom end of the air filter being in fluid communication with the water outlet.

16. The air filtration apparatus as claimed in claim 14 comprising:
a water filter, and
the water outlet being in fluid communication with the water pump through the water filter.

17. The air filtration apparatus as claimed in claim 11 comprising:
the motor being electrically connected to a chipset of the control box; and
the sensor being electrically connected to the chipset of the control box.

18. The air filtration apparatus as claimed in claim 11, wherein the air filter is a washable air filter.

19. The air filtration apparatus as claimed in claim 11, wherein the air filter is a high efficiency particulate air filter.

* * * * *